June 26, 1962 F. C. BOS 3,041,580
LOAD LENGTH WARNING DEVICE
Filed April 13, 1961
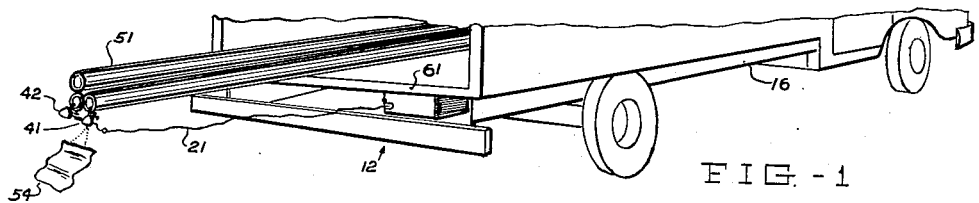
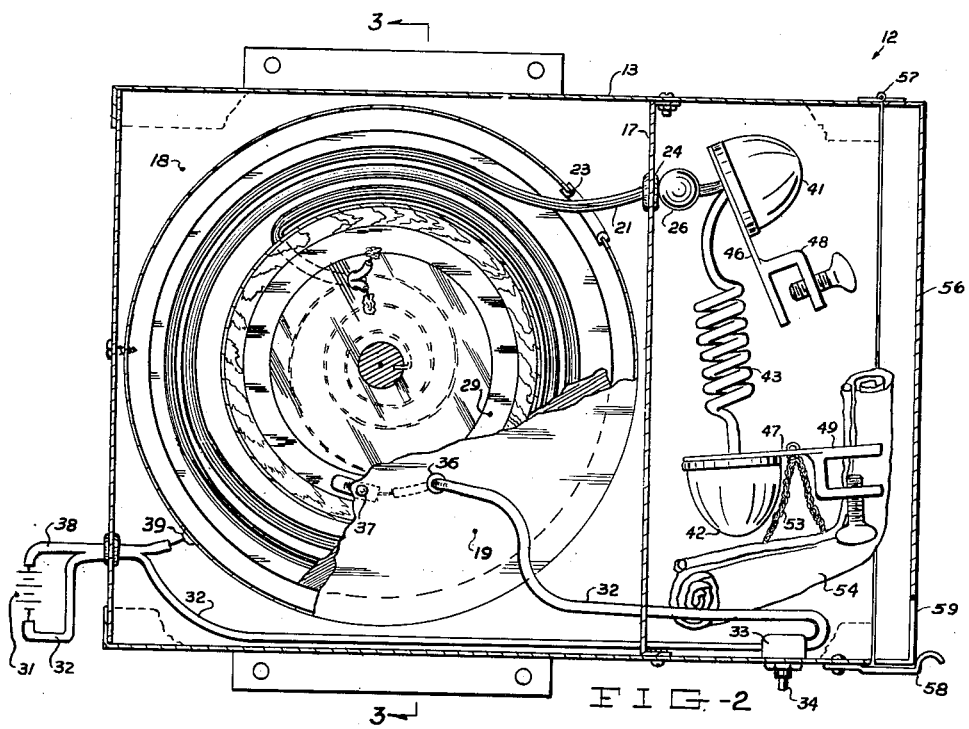
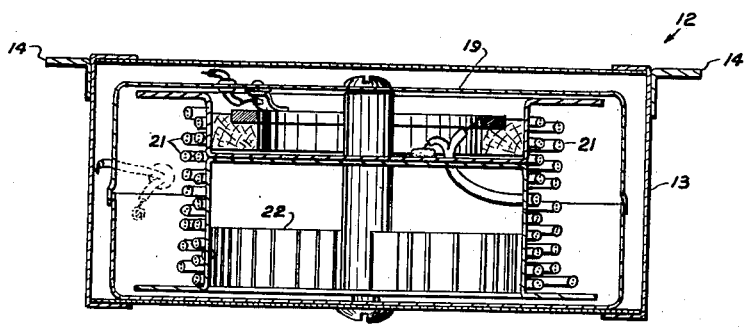
INVENTOR.
FRED C. BOS
BY Lothrop & West

United States Patent Office 3,041,580
Patented June 26, 1962

3,041,580
LOAD LENGTH WARNING DEVICE
Fred C. Bos, Citrus Heights, Calif.
(1200 Highway 9S, Felton, Calif.)
Filed Apr. 13, 1961, Ser. No. 102,686
1 Claim. (Cl. 340—87)

The invention relates to warning devices attached to loads carried by vehicular load carriers.

In practically all jurisdictions there are laws which require that some minimum or specified type of warning member be affixed at the after end of a load projecting rearwardly from a vehicular load carrier to alert following vehicles to the danger.

Frequently, the driver of the loaded vehicle is unable to find a suitable warning member, or the member becomes lost in transit, or for some other reason fails to function as a suitable signal to following vehicles.

It is therefore an object of the invention to provide a load length warning device which is at all times readily available and accessible for use.

It is another object of the invention to provide a warning device which is readily attachable to and detachable from a rearwardly extending load.

It is still another object of the invention to provide a warning device which is relatively inexpensive to make and install, yet which is rugged, durable and long-lived.

It is yet a further object of the invention to provide a warning device which is compact and requires but a small amount of space.

It is a still further object of the invention to provide a warning device which can, as a unit, be readily installed either on existing equipment or at the factory.

It is another object of the invention to provide a generally improved load length warning device.

Other objects, together with the foregoing, are attained in the embodiment described in the following description and shown in the accompanying drawing in which:

FIGURE 1 is a rear perspective view of the device in a typical environment, namely, on the rear end of a truck having an extended load thereon;

FIGURE 2 is a top plan view of the device with the top cover of the housing removed, and showing the device in a retracted condition; and FIGURE 3 is a section, the plane of the section being indicated by the line 3—3 in FIGURE 2.

The warning device unit, generally designated by the reference numeral 12, preferably includes a box-like housing 13 provided with suitable flanges 14 attachable at any desired location adjacent the rear end of a vehicular load carrier, such as a truck 16. A transverse interior partition 17 forms a substantially weatherproof compartment 18 having disposed therein a reel 19.

The reel 19 is an automatic cord control type such as the "Cordomatic," manufactured by the Cordomatic Division of Vacuum Cleaner Corp. of America, Philadelphia, Pennsylvania. Being a commercially available item, it is felt that no detailed description of the reel is necessary other than to state generally that the reel is wound with an electrical conductor 21 retracted by a spring-return member 22. One end of the conductor 21 is led forwardly through a grommet 23 (see FIG. 2) in the reel casing, and through a grommet 24 in the transverse partition 17. A ball 26 secured to the conductor serves as a limit stop. The other end of the conductor is divided into its two component wires, one of the wires being connected to ground 27 and the other wire connected at 28 to a metallic annular ring 29. Current is made available to the ring 29 by a battery 31, such as the vehicle's battery, connected to a conductor 32 led through a switch 33 mounted on the housing 13 and having an exterior actuator button 34. From the switch 33 the conductor 32 passes through an opening 36 in the reel casing and terminates in a wiper 37 in current passing engagement with the annular ring 29, the ring 29 being rotatable in unison with the reel. A ground connection 38 from the battery to the casing at 39 completes the energy supply portion of the circuit.

The load portion of the circuit comprises a pair of electric lamps 41 and 42 connected in parallel through an extensible conductor 43. The lamps 41 and 42 are mounted on brackets 46 and 47, respectively, with each of the brackets being provided with a suitable member, such as clamps 48 and 49, respectively, for mounting the lamps on the rear end of an extended load, such as pipes 51. The extensible conductor 43, connecting the two lamps, enables the lamps to be mounted some distance apart, and at the lateral extremities of the rear end of the load, so as to define the lateral extent of the load. Being in a parallel arrangement, extinction of one lamp will not affect the operation of the other.

While the lamps would ordinarily be turned on during adverse weather or light conditions, a flag suffices during periods of good visibility. Consequently, there is mounted on one of the lamp brackets, for example, the bracket 47, as by a chain 53, a suitable flag 54. When in retracted or closed condition, the flag 54 is conveniently furled, as appears in FIGURE 2; when the device is in extended position, as in FIGURE 1, the flag is unfurled.

Protecting the unit during periods of non use is a door 56, hinged to the housing at 57 and held closed by a spring latch 58. An opening 59 in the latch end of the door permits the conductor 21 to pass through it outwardly from the housing and into the extended location shown in FIGURE 1 while the door is in latched position.

In operation, the unit can either be placed underneath the bed 61 of the truck or on the back side of a tail-gate (not shown) so that when the tail-gate is opened, the unit is on the bottom side of the gate. After loading is completed and the load is secured, the door 56 is opened and the lamps and flag are affixed to the rear end of the load, as shown in FIGURE 1. The door 56 is thereupon closed and latched with the extended conductor 21 residing in the opening 59. Then, depending on visibility, the lamps can be lit, by actuating the switch 33, or they can be left unlighted, the flag 54 being relied upon in this situation. The reverse of the foregoing steps will be effected as unloading is performed.

What is claimed is:

A load length warning device for a carrier comprising:
 a. a rectangular box-like housing having a transverse partition therein dividing said housing into a first portion and a second portion, said second portion being defined at the end opposite said partition by a hinged door having a small opening therein;

b. a spring-return reel rotatably mounted within said first portion of said housing;
c. an extensible electrical conductor wound on said reel and having a free end extending through a grommet in said partition in a direction toward said hinged door, said conductor being capable of passing through said opening in closed position of said door;
d. visual warning means secured to said free end of said conductor, said warning means being capable of being stored within said second portion of said housing in retracted position of said conductor; and
e. means associated with said warning means for affixing said warning means to the rear end of an extended load on a carrier.

References Cited in the file of this patent
UNITED STATES PATENTS

| | | |
|---|---|---|
| 1,535,844 | McLemore | Apr. 28, 1925 |
| 2,891,235 | Halpert | June 16, 1959 |
| 2,894,257 | Crooks | July 7, 1959 |